US010730501B2

(12) United States Patent
Ganzel (10) Patent No.: US 10,730,501 B2
(45) Date of Patent: Aug. 4, 2020

(54) VEHICLE BRAKE SYSTEM WITH AUXILIARY PRESSURE SOURCE

(71) Applicant: Kelsey-Hayes Company, Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 16/205,170

(22) Filed: Nov. 29, 2018

(65) Prior Publication Data

US 2019/0092304 A1    Mar. 28, 2019

Related U.S. Application Data

(63) Continuation-in-part of application No. 14/868,187, filed on Sep. 28, 2015, which is a continuation-in-part (Continued)

(51) Int. Cl.
*B60T 13/74*    (2006.01)
*B60T 13/68*    (2006.01)
(Continued)

(52) U.S. Cl.
CPC ............ *B60T 13/745* (2013.01); *B60T 7/042* (2013.01); *B60T 8/4018* (2013.01);
(Continued)

(58) Field of Classification Search
CPC .... B60T 11/224; B60T 13/166; B60T 13/745; B60T 2270/402
See application file for complete search history.

(56) References Cited

U.S. PATENT DOCUMENTS 4,324,101 A * 4/1982 Farr ..................... B60T 11/20
    60/562
5,557,935 A 9/1996 Ganzel
(Continued)

FOREIGN PATENT DOCUMENTS

CN         102582605 A     7/2012
DE    102007016863 A1    10/2008
(Continued)

OTHER PUBLICATIONS

International Search Report of PCT/US2015/052714, dated Jan. 8, 2016.
(Continued)

*Primary Examiner* — Bradley T King
(74) *Attorney, Agent, or Firm* — Macmillian, Sobanski & Todd, LLC (57) ABSTRACT

A brake system for actuating a pair of front wheel brakes and a pair of second wheel brakes. The brake system includes a reservoir and a brake pedal unit having a housing with first and second pistons slidably disposed in the housing. The first and second pistons are operable during a manual push-through mode by actuation of a brake pedal connected to the brake pedal unit. The first and second pistons are movable to generate brake actuating pressure at first and second outputs for actuating the pair of front wheel brakes and the pair of rear wheel brakes. A first source of pressurized fluid actuates the pair of front wheel brakes and the pair of rear wheel brakes during a non-failure normal braking event. A first electronic control unit controls the first source of pressurized fluid. A second source of pressurized fluid is hydraulically connected to the brake pedal unit and actuates the brake pedal unit to cause movement of the first and second pistons for generating pressure at the first and second outputs. A second electronic control unit, separate from the
(Continued)

first electronic control unit, controls the second source of pressurized fluid.

17 Claims, 4 Drawing Sheets

Related U.S. Application Data of application No. 13/843,587, filed on Mar. 15, 2013, now Pat. No. 9,321,444.

(60) Provisional application No. 62/592,193, filed on Nov. 29, 2017, provisional application No. 62/068,134, filed on Oct. 24, 2014, provisional application No. 62/055,698, filed on Sep. 26, 2014.

(51) Int. Cl.
   *B60T 8/40* (2006.01)
   *B60T 7/04* (2006.01)
   *B60T 13/16* (2006.01)

(52) U.S. Cl.
   CPC .......... *B60T 8/4081* (2013.01); *B60T 13/166* (2013.01); *B60T 13/686* (2013.01)

(56) References Cited

U.S. PATENT DOCUMENTS

| | | | |
|---|---|---|---|
| 5,758,930 A | 6/1998 | Schiel et al. | |
| 5,836,659 A | 11/1998 | Feigel et al. | |
| 5,970,710 A * | 10/1999 | Dieringer | B60T 8/441 60/575 |
| 6,079,797 A | 6/2000 | Ganzel | |
| 6,158,825 A | 12/2000 | Schunuck et al. | |
| 6,494,546 B1 | 12/2002 | Feigel | |
| 6,547,342 B1 | 4/2003 | Schaust et al. | |
| 6,860,569 B1 | 3/2005 | Campau et al. | |
| 7,004,551 B2 | 2/2006 | Yokoyama et al. | |
| 7,063,393 B2 | 6/2006 | Suzuki et al. | |
| 7,552,978 B2 | 6/2009 | Yokoyama et al. | |
| 7,651,176 B2 | 1/2010 | Inoue et al. | |
| 7,922,264 B2 | 4/2011 | Baumann et al. | |
| 8,038,229 B2 | 10/2011 | Leiber et al. | |
| 8,333,442 B2 | 12/2012 | Hatano et al. | |
| 9,487,201 B2 | 11/2016 | Linden | |
| 2004/0251095 A1 | 12/2004 | Simard et al. | |
| 2006/0220451 A1* | 10/2006 | Drumm | B60T 8/4018 303/114.1 |
| 2007/0199436 A1 | 8/2007 | Ikeda et al. | |
| 2007/0278855 A1 | 12/2007 | Hatano | |
| 2008/0257670 A1* | 10/2008 | Drumm | B60T 8/4077 188/358 |
| 2008/0258546 A1* | 10/2008 | Drumm | B60T 7/042 303/115.4 |
| 2010/0026083 A1 | 2/2010 | Leiber et al. | |
| 2010/0114444 A1 | 5/2010 | Verhagen et al. | |
| 2010/0181825 A1* | 7/2010 | Drumm | B60T 8/4077 303/122.13 |
| 2011/0120121 A1 | 5/2011 | Sprocq et al. | |
| 2011/0120122 A1 | 5/2011 | Cagnac et al. | |
| 2012/0013173 A1 | 1/2012 | Leiber et al. | |
| 2012/0169112 A1 | 7/2012 | Jungbecker et al. | |
| 2012/0306261 A1 | 12/2012 | Leiber et al. | |
| 2013/0147259 A1* | 6/2013 | Linkenbach | B60T 7/042 303/14 |
| 2013/0162013 A1* | 6/2013 | Drumm | B60T 7/042 303/14 |
| 2013/0312404 A1 | 11/2013 | Ganzel et al. | |
| 2016/0193990 A1* | 7/2016 | Drumm | B60T 7/042 701/70 |
| 2017/0043756 A1* | 2/2017 | Drumm | B60T 7/042 |
| 2017/0129468 A1* | 5/2017 | Besier | B60T 8/4077 |
| 2017/0129469 A1* | 5/2017 | Besier | B60T 13/662 |
| 2019/0031165 A1* | 1/2019 | Besier | B60T 13/686 |
| 2019/0092303 A1* | 3/2019 | Kato | B60T 8/17 |
| 2019/0225205 A1* | 7/2019 | Ganzel | B60T 13/686 |

FOREIGN PATENT DOCUMENTS

| | | |
|---|---|---|
| DE | 102008014462 A1 | 9/2009 |
| DE | 102010038956 | 8/2010 |
| DE | 102010040097 A1 | 3/2011 |
| DE | 102010023865 A1 | 12/2011 |
| DE | 102011080312 A1 | 2/2012 |
| EP | 2100784 A2 | 9/2009 |
| EP | 2233377 B1 | 6/2012 |
| EP | 2969677 | 9/2016 |
| JP | 2012250559 A | 12/2012 |
| WO | 2008122468 A1 | 10/2008 |
| WO | 2010006978 A1 | 1/2010 |
| WO | 2010006998 A1 | 1/2010 |
| WO | 2012017037 A2 | 2/2012 |
| WO | 2012058330 A2 | 5/2012 |
| WO | 2014145454 A1 | 9/2014 |

OTHER PUBLICATIONS

European Extended Search Report, Application No. 14762531.3, dated Sep. 28, 2016.
PCT International Search Report and Written Opinion, Application No. PCT/US2014/030222, dated Jul. 3, 2014.
Notification of First Office Action, Application No. 201580051607.5, dated Dec. 3, 2018.

* cited by examiner

VEHICLE BRAKE SYSTEM WITH AUXILIARY PRESSURE SOURCE

CROSS-REFERENCE TO RELATED APPLICATIONS

This application is a continuation-in-part of U.S. patent application Ser. No. 14/868,187, filed Sep. 28, 2015, which claims the benefit of the earlier filing date of U.S. patent application Ser. No. 13/843,587, filed Mar. 15, 2013, U.S. Provisional Application No. 62/068,134, filed Oct. 24, 2014, and U.S. Provisional Application No. 62/055,698, filed Sep. 26, 2014, the entirety of each of which is incorporated herein by reference. This application further claims the benefit of U.S. Provisional Application No. 62/592,193, filed Nov. 29, 2017, the disclosure of which is incorporated herein by reference in its entirety.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Brake systems may also include autonomous braking capabilities such as adaptive cruise control (ACC). During an autonomous braking event, various sensors and systems monitor the traffic conditions ahead of the vehicle and automatically activate the brake system to decelerate the vehicle as needed. Autonomous braking may be configured to respond rapidly in order to avoid an emergency situation. The brake system may be activated without the driver depressing the brake pedal or even if the driver fails to apply adequate pressure to the brake pedal. Advanced autonomous braking systems are configured to operate the vehicle without any driver input and rely solely on the various sensors and systems that monitor the traffic conditions surrounding the vehicle.

SUMMARY OF THE INVENTION

This invention relates to a brake system for actuating a pair of front wheel brakes and a pair of second wheel brakes. The brake system includes a reservoir and a brake pedal unit having a housing with first and second pistons slidably disposed in the housing. The first and second pistons are operable during a manual push-through mode by actuation of a brake pedal connected to the brake pedal unit. The first and second pistons are movable to generate brake actuating pressure at first and second outputs for actuating the pair of front wheel brakes and the pair of rear wheel brakes. A first source of pressurized fluid actuates the pair of front wheel brakes and the pair of rear wheel brakes during a non-failure normal braking event. A first electronic control unit controls the first source of pressurized fluid. A second source of pressurized fluid is hydraulically connected to the brake pedal unit and actuates the brake pedal unit to cause movement of the first and second pistons for generating pressure at the first and second outputs. A second electronic control unit, separate from the first electronic control unit, controls the second source of pressurized fluid.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
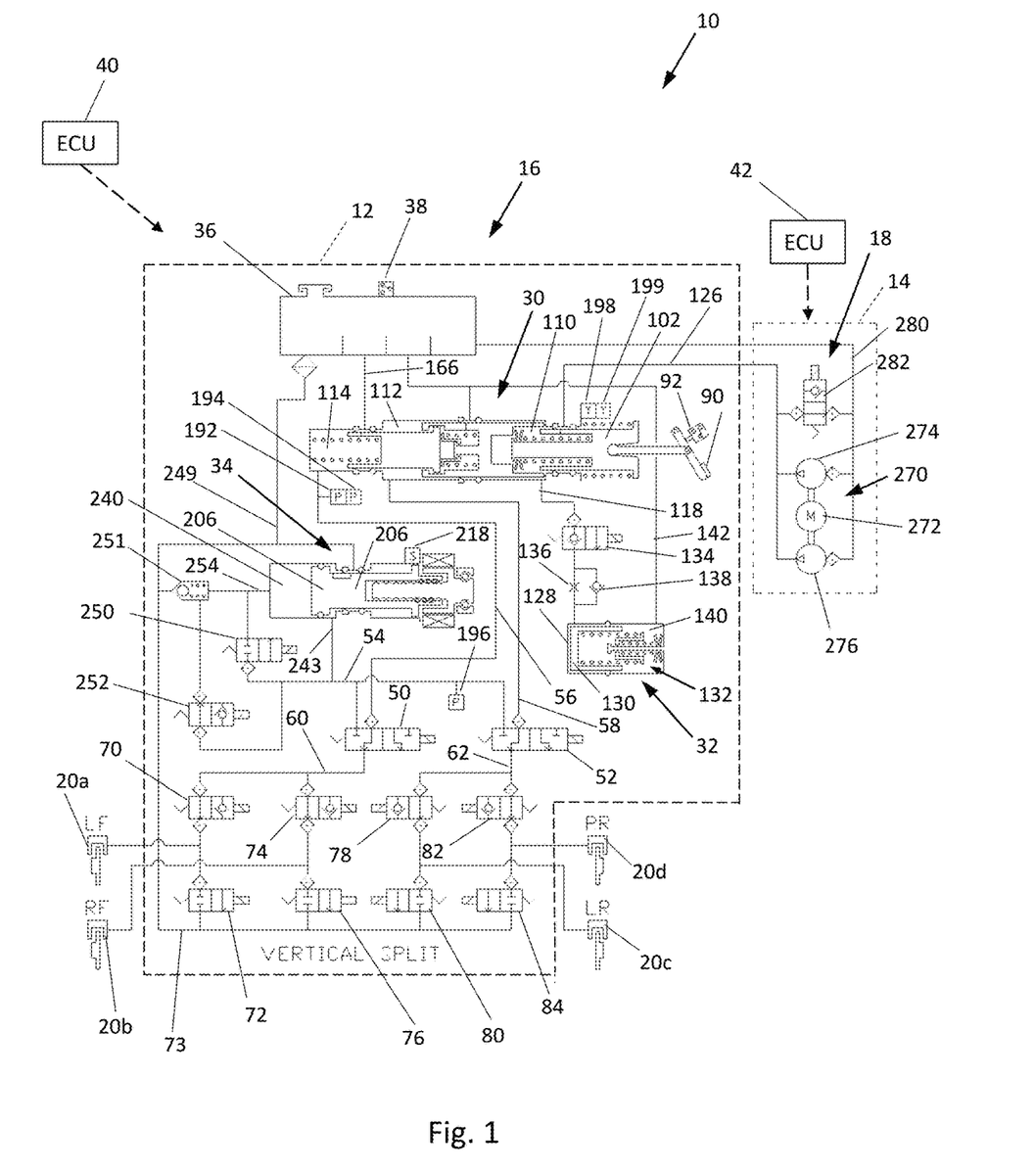
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic boost braking system in which boosted fluid pressure is utilized to apply braking forces for the brake system 10. The brake system 10 may suitably be used on a ground vehicle such as an automotive vehicle having four wheels with a wheel brake associated with each wheel. Furthermore, the brake system 10 can be provided with other braking functions such as anti-lock braking (ABS) and other slip control features to effectively brake the vehicle, as will be discussed below.

The brake system 10 generally includes a main block or housing, indicated by broken lines 12, and a second block or power pack housing, indicated by broken lines 14. The various components of the brake system 10 are housed in the main housing 12 and the power pack housing 14. As will be discussed below, the main housing 12 contains various components defining a main brake circuit, indicated generally at 16. As will also be discussed below, the power pack housing 14 houses various components of a power pack assembly, indicated generally at 18. The housings 12 and 14 may include one or more blocks or housings made from solid material, such as aluminum, that has been drilled, machined, or otherwise formed to house the various components. Fluid conduits may also be formed in the housings 12 and 14 to provide fluid passageways between the various components. The housings 12 and 14 may be single structures or may be made of two or more parts assembled together. In a preferred embodiment and schematically shown in FIG. 1, the power pack housing 14 and the power pack assembly 18 housed therein are located remotely from the main housing 12 and the main brake circuit with hydraulic lines hydraulically coupling the housings 12 and 14 such that fluid may pass between the housings 12 and 14 and the respective components housed therein. Manufacturing separate housings 12 and 14 has an advantage of being able to provide customers a simpler brake system with just the housing 12 with the main brake circuit 16, while a more feature enhanced brake system 10 can be easily provided by adding the housing 14 and the power pack assembly 18. Alternatively, the housings 12 and 14 may define a single housing. It should also be understood that the grouping of components as illustrated in FIG. 1 is not intended to be limiting and any number of components may be housed in either of the housings 12 and 14.

Figure 4:
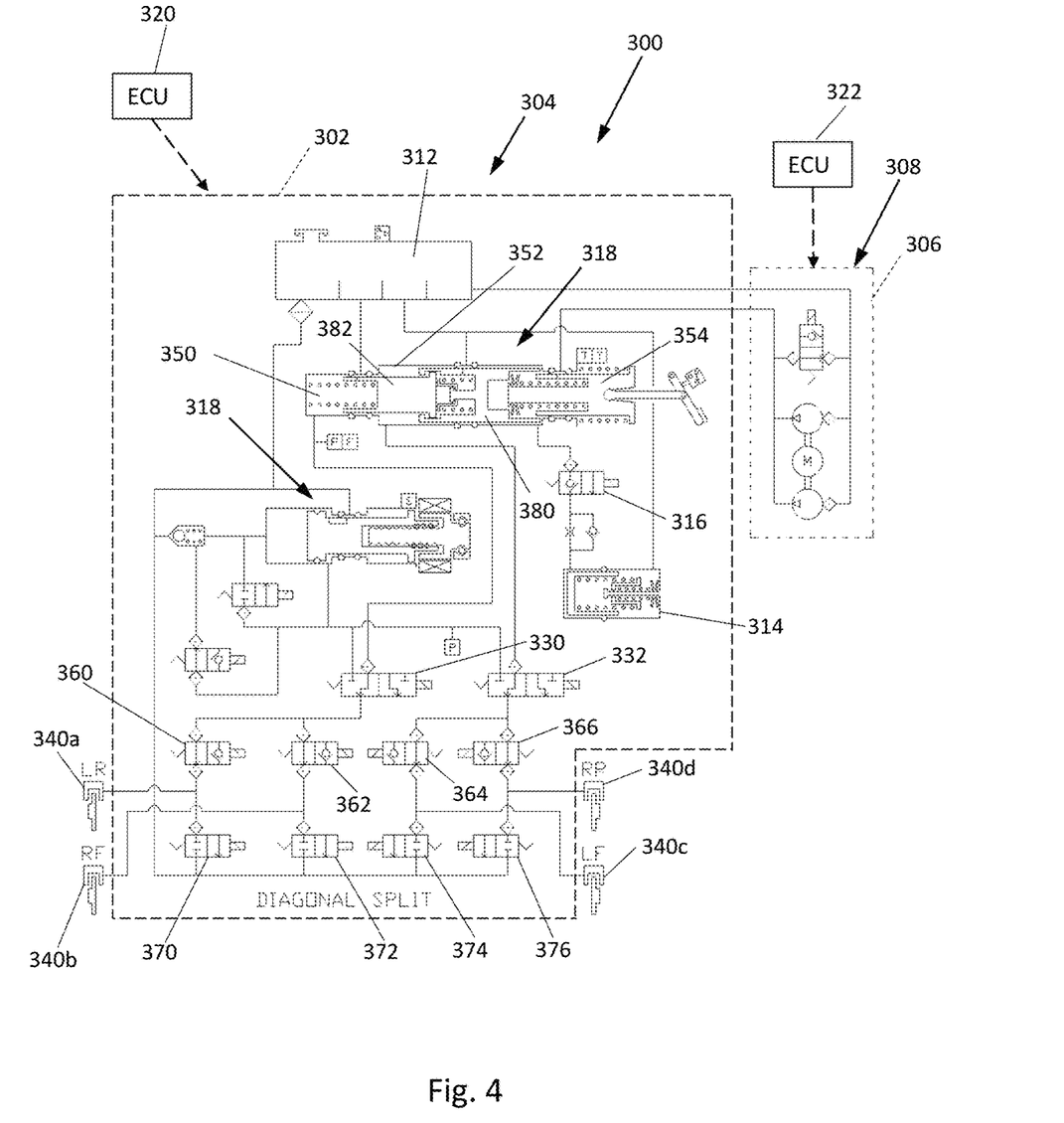
FIG. 4 is a schematic illustration of an alternate embodiment of a brake system.

In the illustrated embodiment of the brake system 10, there are four wheel brakes 20a, 20b, 20c, and 20d. The wheel brakes 20a, 20b, 20c, and 20d can have any suitable wheel brake structure operated by the application of pressurized brake fluid. The wheel brakes 20a, 20b, 20c, and 20d may include, for example, a brake caliper mounted on the vehicle to engage a frictional element (such as a brake disc) that rotates with a vehicle wheel to effect braking of the associated vehicle wheel. The wheel brakes 20a, 20b, 20c, and 20d can be associated with any combination of front and rear wheels of the vehicle in which the brake system 10 is installed. However, in one embodiment as illustrated in FIG. 1, the brake system 10 is configured as a vertical split system such that a front pressure circuit is associated with providing fluid to the wheel brakes 20a and 20b, and a rear pressure circuit is associated with providing fluid to the wheel brakes 20c and 20d. For example, the wheel brake 20a may be associated with a left front wheel of the vehicle in which the brake system 10 is installed, and the wheel brake 20b may be associated with the right front wheel. The wheel brake 20c may be associated with the left rear wheel, and the wheel brake 20d may be associated with the right rear wheel. As will be explained below, the front and rear pressure circuits may be isolated from another such that the front and rear pressure circuits may have different pressure levels generated by various components of the brake system 10. It is noted that FIG. 4 illustrates an alternate embodiment of a brake system having a diagonally split configuration which will be explained in detail below.

Referring again to FIG. 1, the main brake circuit 16 of the brake system 10 generally includes a brake pedal unit, indicated generally at 30, a pedal simulator 32, a plunger assembly, indicated generally at 34, and a fluid reservoir 36. The reservoir 36 stores and holds hydraulic fluid for the brake system 10. The fluid within the reservoir 36 is preferably held at or about atmospheric pressure but may store the fluid at other pressures if so desired. The reservoir 36 is shown schematically having four tanks or sections with four fluid conduit lines connected thereto. The sections can be separated by several interior walls within the reservoir 36 and are provided to prevent complete drainage of the reservoir 36 in case one of the sections is depleted due to a leakage via one of the four lines connected to the reservoir 36. Alternatively, the reservoir 36 may include multiple separate housings. The reservoir 36 may include a fluid level sensor 38 for detecting the fluid level of one or more of the sections of the reservoir 36. As will be discussed in detail below, the plunger assembly 34 of the brake system 10 functions as a source of pressure to provide a desired pressure level to the wheel brakes 20a, 20b, 20c, and 20d during a typical or normal brake apply. After a brake apply, fluid from the wheel brakes 20a, 20b, 20c, and 20d may be returned to the plunger assembly 34 and/or diverted to the reservoir 36.

The brake system 10 further includes a main electronic control unit or ECU 40. The main ECU 40 may include microprocessors and other electrical circuitry. The main ECU 40 receives various signals, processes signals, and controls the operation of various electrical components of the brake system 10 in response to the received signals. The ECU 40 can be connected to various sensors such as the reservoir fluid level sensor 38, pressure sensors, travel sensors, switches, wheel speed sensors, and steering angle sensors. The ECU 40 may also be connected to an external module (not shown) for receiving information related to yaw rate, lateral acceleration, longitudinal acceleration of the vehicle such as for controlling the brake system 10 during vehicle stability operation. Additionally, the ECU 40 may be connected to the instrument cluster for collecting and supplying information related to warning indicators such as an ABS warning light, a brake fluid level warning light, and a traction control/vehicle stability control indicator light.

The brake system 10 also includes a secondary ECU 42. In a preferred embodiment, the main ECU 40 generally controls the main brake circuit 16, while the secondary ECU 42 controls the power pack assembly 18. The secondary ECU 42 is similar in structure and function as the main ECU 40 and may include microprocessors and other electrical circuitry. Similarly, the secondary ECU 42 receives various signals, processes signals, and controls the operation of various electrical components of the power pack assembly 18 in response to the received signals, and can be connected to various sensors, pressure sensors, travel sensors, switches, wheel speed sensors, and steering angle sensors. While the main ECU 40 can be configured to generally control the entire brake system 10 (or just the main brake circuit 16), the secondary ECU 42 may be a less complicated control module compared to the main ECU 40 for generally controlling operation of the power pack assembly 42, as will be described in more detail below. For example, the secondary ECU 42 may be connected to fewer components than the main ECU 40 and require less computing power and inputs, thereby reducing overall cost. Alternatively, the secondary ECU 42 may be configured and connected similarly as the main ECU 40 to provide for a redundant control module in case of failure of the main ECU 40. The main ECU 40 and the secondary ECU 42 may be physically attached to the housings 12 and 14, respectively, or may be located remotely therefrom.

The main brake circuit 16 of the brake system 10 further includes first and second isolation valves 50 and 52. The isolation valves 50 and 52 may be solenoid actuated three way valves. The isolation valves 50 and 52 are generally operable to two positions, as schematically shown in FIG. 1. The first and second isolation valves 50 and 52 each have a port in selective fluid communication with an output conduit 54 generally in communication with the output of the plunger assembly 34, as will be discussed below. The first and second isolation valves 50 and 52 also includes ports that are in fluid communication with conduits 56 and 58, respectively, which are connected to the brake pedal unit 30 when the first and second isolation valves 50 and 52 are de-energized, as shown in FIG. 1. The first and second isolation valves 50 and 22 further include ports that are in fluid communication with conduits 60 and 62, respectively, which provide fluid to and from the wheel brakes 20a, 20b, 20c, and 20d.

In a preferred embodiment, the first and/or second isolation valves 50 and 52 may be mechanically designed such that flow is permitted to flow in the reverse direction (from the output conduit 54 to the conduits 56 and 58, respectively) when in their de-energized positions and can bypass the normally closed seat of the valves 50 and 52. Thus, although the 3-way valves 50 and 52 are not shown schematically to indicate this fluid flow position, it is noted that that the valve design may permit such fluid flow. This may be helpful in performing self-diagnostic tests of the brake system 10.

The system 10 further includes various solenoid actuated valves (slip control valve arrangement) for permitting controlled braking operations, such as ABS, traction control, vehicle stability control, dynamic rear proportioning, regenerative braking blending, and autonomous braking. A first set of valves includes a first apply valve 70 and a first dump valve 72 in fluid communication with the conduit 60 for cooperatively supplying fluid received from the first isolation valve 50 to the front wheel brake 20a, and for cooperatively relieving pressurized fluid from the wheel brake 20a to a reservoir conduit 73 in fluid communication with the reservoir 36. A second set of valves includes a second apply valve 74 and a second dump valve 76 in fluid communication with the conduit 60 for cooperatively supplying fluid received from the first isolation valve 50 to the wheel brake 20b, and for cooperatively relieving pressurized fluid from the wheel brake 20b to the reservoir conduit 73. A third set of valves includes a third apply valve 78 and a third dump valve 80 in fluid communication with the conduit 62 for cooperatively supplying fluid received from the second isolation valve 52 to the wheel brake 20c, and for cooperatively relieving pressurized fluid from the wheel brake 20c to the reservoir conduit 73. A fourth set of valves includes a fourth apply valve 82 and a fourth dump valve 84 in fluid communication with the conduit 62 for cooperatively supplying fluid received from the second isolation valve 52 to the wheel brake 20d, and for cooperatively relieving pressurized fluid from the wheel brake 20d to the reservoir conduit 73. Note that in a normal braking event, fluid flows through the de-energized open apply valves 70, 74, 78, and 82. Additionally, the dump valves 72, 76, 80, and 84 are preferably in their de-energized closed positions to prevent the flow of fluid to the reservoir 36.

The brake pedal unit 30 is connected to a brake pedal 90 and is actuated by the driver of the vehicle as the driver presses on the brake pedal 90. A brake sensor or switch 92 may be connected to the ECU 40 to provide a signal indicating a depression of the brake pedal 90. As will be discussed below, the brake pedal unit 30 may be used as a back-up source of pressurized fluid to essentially replace the normally supplied source of pressurized fluid from the plunger assembly 34 under certain failed conditions of the brake system 10 such as a manual push-through event. The brake pedal unit 30 can supply pressurized fluid to the conduits 56 and 58 (that are normally closed off at the first and second isolation valves 50 and 22 during a normal brake apply) to the wheel brake 20a, 20b, 20c, and 20d as required.

Figure 2:
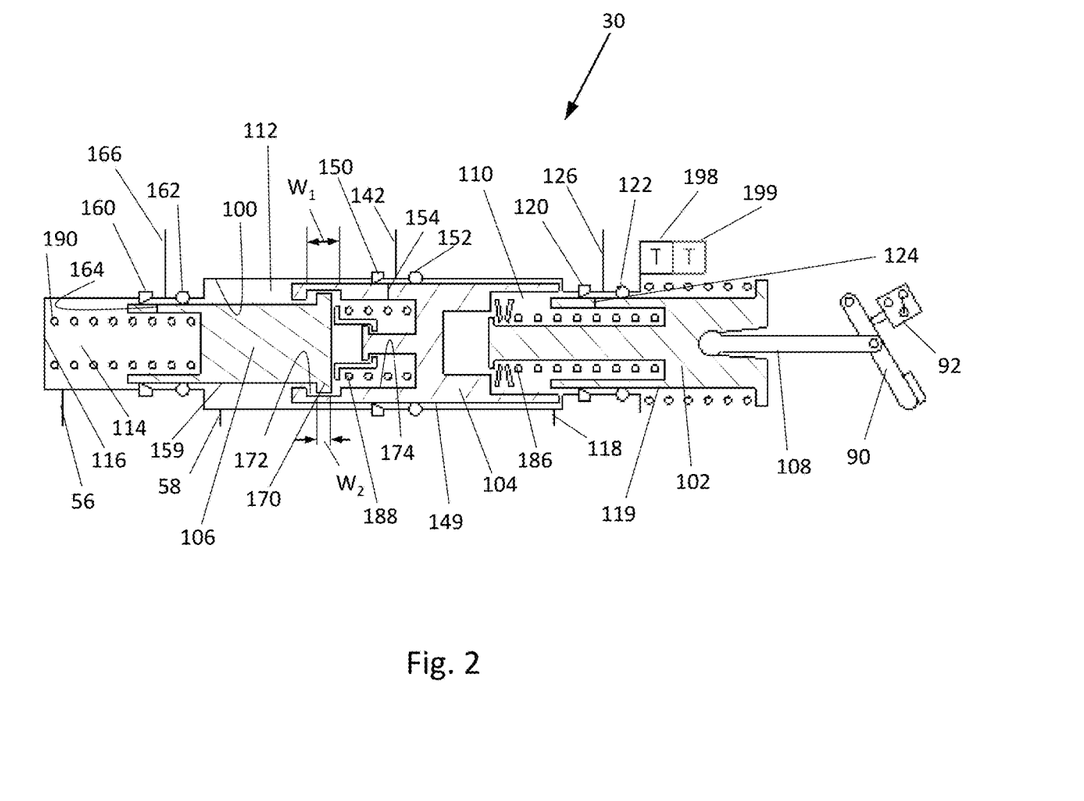
FIG. 2 is an enlarged schematic illustration of the brake pedal unit of the brake system of FIG. 1.

As shown schematically in FIG. 2, the brake pedal unit 30 includes a housing having a multi-stepped bore 100 formed therein for slidably receiving various cylindrical pistons and other components therein. Note that the housing is not specifically schematically shown in FIG. 2 but instead the walls of the bore 100 are illustrated. The housing may be formed as a single unit or include two or more separately formed portions coupled together. An input piston 102, a primary piston 104, and a secondary piston 106 are slidably disposed within the bore 100. The input piston 102 is connected with the brake pedal 90 via a linkage arm 108. Leftward movement of the input piston 102, the primary piston 104, and the secondary piston 106 may cause, under certain conditions, a pressure increase within an input chamber 110, a primary chamber 112, and a secondary chamber 114, respectively. Various seals of the brake pedal unit 30 as well as the structure of the housing and the pistons 102, 104, and 106 define the chambers 110, 112, and 114, respectively. For example, the input chamber 110 is generally defined between the input piston 102 and the primary piston 104. The primary chamber 112 is generally defined between the primary piston 104 and the secondary piston 106. The secondary chamber 114 is generally defined between the secondary piston 86 and an end wall 116 of the housing formed by the bore 100. The primary and secondary pistons 104 and 106 define a pair of output pistons for the brake pedal unit 30. The primary and secondary chambers 112 and 114 define a pair of outputs of the brake pedal unit 30.

The input chamber 110 is in fluid communication with the pedal simulator 32 via a conduit 118, the reason for which will be explained below. The input piston 102 is slidably disposed in the bore 100 of the housing of the brake pedal unit 30. An outer cylindrical wall 119 of the input piston 102 is engaged with a lip seal 120 and a seal 122 mounted in grooves formed in the housing. A fluid passageway 124 (or multiple passageways) is formed through a wall of the input piston 102. As shown in FIGS. 1 and 2, when the brake pedal unit 30 is in its rest position (the driver is not depressing the brake pedal 90), the passageway 124 is located between the lip seal 120 and the seal 122. In the rest position, the passageway 124 permits fluid communication between the input chamber 110 and the reservoir 36 via a conduit 126. As will be discussed below, the conduit 126 provides fluid communication to the reservoir 36 through the power pack assembly 18 under certain condition, one of which is during a rest mode of the brake system 10 when the brake system 10 is not being operated by the driver or by the ECUs 40 and 42.

During initial operation of the brake pedal unit 30, sufficient leftward movement of the input piston 102, as viewing FIGS. 1 and 2, will cause the passageway 124 to move past the lip seal 102, thereby preventing the flow of fluid from the input chamber 110 into the conduit 126 and into the reservoir 36. Further leftward movement of the input piston 102 will pressurize the input chamber 110 causing fluid to flow into the pedal simulator 32 via the conduit 118. As fluid is diverted into the pedal simulator 32, a simulation pressure chamber 128 (now showing compressed in FIG. 1) within the pedal simulator 32 will expand causing movement of a piston 130 within the pedal simulator 32. Movement of the piston 130 compresses a spring assembly, indicated generally at 132, housed within the pedal simulator 32 and biasing the piston 130 in a leftward direction, as viewing FIG. 1. The compression of the spring assembly 132 provides a feedback force to the driver of the vehicle via the brake pedal 90 which simulates the forces a driver feels at the brake pedal 90 in a conventional vacuum assist hydraulic brake system, for example. The spring assembly 132 of the pedal simulator 32 may be housed within a non-pressurized chamber 140 in fluid communication with the reservoir 36 via a conduit 142.

The spring assembly 132 of the pedal simulator 32 can include any number and types of spring members as desired. For example, the spring assembly 132 may include a combination of low rate and high rate spring elements to provide a non-linear force feedback. The simulation pressure chamber 128 of the pedal simulator 32 is in fluid communication with the conduit 118 which is in fluid communication with the input chamber 110. A solenoid actuated simulator valve 134 is positioned within the conduit 118 to selectively prevent the flow of fluid from the input chamber 110 to the simulation pressure chamber 128, such as during a failed condition in which the brake pedal unit 30 is utilized to provide a source of pressurized fluid to the wheel brakes 20a, 20b, 20c, and 20d.

The brake system 10 may further include a check valve 136 which is in a parallel path arrangement with a restricted orifice 138 in the conduit 118. The check valve 136 and the restricted orifice 138 could be integrally built or formed in the simulator valve 134 or may be formed separately therefrom. The restricted orifice 136 provides damping during a spike apply in which the driver depresses the brake pedal 90 rapidly and forcefully. This damping provides a force feedback making depression of the brake pedal 90 feel more like a traditional vacuum booster, which may be a desirable characteristic of the brake system 10. The damping may also provide a more accurate relationship between brake pedal travel and vehicle deceleration by generally avoiding too much brake pedal travel for the vehicle deceleration that can be delivered by the brake system 10. The check valve 136 provides an easy flow path and allows the brake pedal 90 to return quickly, which allows the associated brake pressure to decrease quickly per the driver's intent.

As shown in FIG. 1, the primary chamber 112 of the brake pedal unit 30 is in fluid communication with the second isolation valve 52 via the conduit 58. Referring now to FIG. 2, the primary piston 104 is slidably disposed in the bore 100 of the housing of the brake pedal unit 30. An outer wall 149 of the primary piston 104 is engaged with a lip seal 150 and a seal 152 mounted in grooves formed in the housing. One or more passageway(s) 154 are formed through a wall of the primary piston 104. The passageway 154 is located between the lip seal 150 and the seal 152 when the primary piston 104 is in its rest position, as shown in FIGS. 1 and 2. Note that in the rest position of the brake pedal unit 30, the lip seal 150 is just slightly to the left of the passageway 154, thereby permitting fluid communication between the primary chamber 112 and the reservoir 36 via the conduit 142.

As shown in FIG. 1, the secondary chamber 114 of the brake pedal unit 30 is in fluid communication with the first isolation valve 50 via the conduit 56. Referring now to FIG.

2, the secondary piston 106 is slidably disposed in the bore 100 of the housing of the brake pedal unit 30. An outer wall 159 of the secondary piston 106 is engaged with a lip seal 160 and a seal 162 mounted in grooves formed in the housing. One or more passageway(s) 164 are formed through a wall of the secondary piston 106. As shown in FIG. 2, the passageway 164 is located between the lip seal 150 and the seal 152 when the secondary piston 106 is in its rest position. Note that in the rest position of the brake pedal unit 30, the lip seal 150 is just slightly to the left of the passageway 164, thereby permitting fluid communication between the secondary chamber 114 and the reservoir 36 via a conduit 166.

If desired, the primary and secondary pistons 104 and 106 may be mechanically connected but with limited movement therebetween. The mechanical connection of the primary and secondary pistons 104 and 106 prevents a large gap or distance between the primary and secondary pistons 104 and 106. This helps prevent lost pedal travel by preventing having to advance the primary and secondary pistons 104 and 106 over a relatively large distance without any increase in pressure during a failed system event. For example, if the brake system 10 is under a manual push-through mode and fluid pressure is lost in the front circuit relative to the secondary piston 106 (secondary chamber 114), such as for example in the conduit 56, the secondary piston 106 will be forced or biased in the leftward direction due to the greater pressure within the primary chamber 112. If the primary and secondary pistons 104 and 106 were not connected together, the secondary piston 106 would freely travel to its further most left-hand position, as viewing FIGS. 1 and 2, and the driver would have to depress the pedal 90 a distance to compensate for this loss in travel. However, because the primary and secondary pistons 104 and 106 are connected together, the secondary piston 106 is prevented from this movement and relatively little loss of travel occurs in this type of failure.

Any suitable mechanical connection between the primary and secondary pistons 104 and 106 may be used. For example, as schematically shown in FIG. 2, the right-hand end of the secondary piston 106 includes an outwardly extending flange 170 that extends into a groove 172 formed in an inner wall 174 of the primary piston 104. The groove 172 has a width $W_1$ which is greater than the width $W_2$ of the flange 170, thereby providing a relatively small amount of travel between the primary and secondary pistons 104 and 106 relative to one another.

The brake pedal unit 30 may include an input spring assembly 186 generally disposed between the input piston 102 and the primary piston 104. Additionally, the brake pedal unit 30 may include a primary spring 188 disposed between the primary piston 104 and the secondary piston 106. A secondary spring 190 may be included and disposed between the secondary piston 106 and the bottom wall 116 of the bore 100. The input, primary and secondary springs 186, 188, 190 may have any suitable configuration, such as a caged spring assembly, for biasing the pistons in a direction away from each other and also to properly position the pistons within the housing of the brake pedal unit 30.

As shown in FIG. 1, the brake system 10 may further include a pressure sensor 192 in fluid communication with the conduit 56 to detect the pressure within the secondary pressure chamber 114 of the brake pedal unit 30 and for transmitting the signal indicative of the pressure to the main ECU 40. Additionally, the brake system 10 may further include a redundant pressure sensor 194 also in fluid communication with the conduit 56 but for transmitting the signal indicative of the pressure to the secondary ECU 42. The secondary ECU 42 may utilize the signal from the pressure sensor 194 for diagnostic purposes to determine if the brake pedal unit 30 is operating properly. If desired, the main ECU 40 may receive signals from both pressure sensors 192 and 194. The brake system 10 further includes a pressure sensor 196 in fluid communication with the output conduit 54 for transmitting a signal indicative of the pressure at the output of the plunger assembly 34. The main ECU 40 utilizes the signals from the pressure sensors 192 and 196 to actuate the main brake circuit 16 of the brake system 10 under various braking events.

In a preferred embodiment of the brake system 10, the brake pedal unit 30 includes first and second travel sensors 198 and 199 for producing signals that are indicative of the length of travel and/or rate of travel of the input piston 102 and providing the signals to the main ECU 40 and the secondary ECU 42, respectively. The travel sensor 199 may be provided for redundancy and may also be connected to the main ECU 40 for that purpose. In an alternate embodiment, a single travel sensor is used that is connected to both the main ECU 40 and the secondary ECU 42 for providing signals thereto. The main ECU 40 utilizes the signal from the first and/or second travel sensor 198 and 199 to actuate the main brake circuit 16 of the brake system 10 in accordance with the driver's intent via detection of the travel of the input piston 102. The secondary ECU 42 may utilize the signal from the travel sensor 199 for diagnostic purposes to determine if the brake pedal unit 30 is operating properly.

Figure 3:
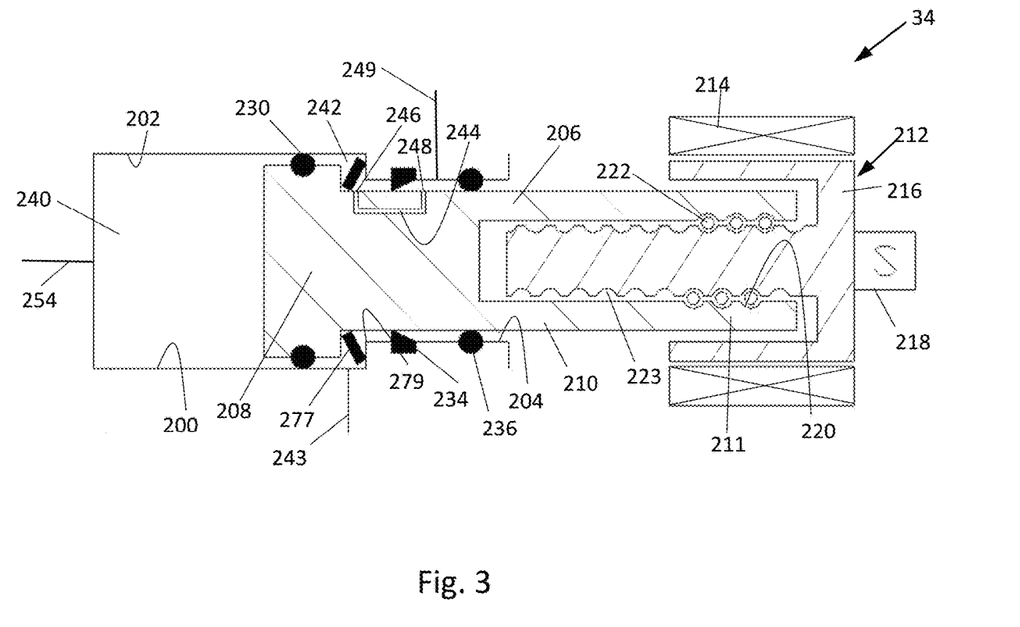
FIG. 3 is an enlarged schematic illustration of the plunger assembly of the brake system of FIG. 1.

Referring now to FIG. 3, there is schematically illustrated an enlarged view of the plunger assembly 34. The plunger assembly 34 includes a housing having a multi-stepped bore 200 formed therein. Note that the housing is not specifically schematically shown in FIG. 3 but instead the walls of the bore 200 are illustrated. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 3), and a rearward direction (rightward as viewing FIGS. 1 and 3) within the bore 200 of the housing. In the embodiment shown, the ball screw mechanism 212 includes an electric motor, indicated schematically at 214, which is electrically connected to the main ECU 40 for actuation thereof. The motor 214 rotatably drives a screw shaft 216. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction.

Although a ball screw mechanism 212 is shown and described with respect to the plunger assembly 34, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212. Of course, under this circumstance, the screw shaft 216 would be configured to function as a nut having internal helical raceways formed therein. The piston 206 may include structures (not shown) engaged with cooperating structures formed in the housing of the plunger assembly 34 to prevent rotation of the piston 206 as the screw shaft 216 rotates around the piston 206. For example, the piston 206 may include outwardly extending splines or tabs (not shown) that are disposed within longitudinally extending grooves (not shown) formed in the housing of the plunger assembly 34 such that the tabs slide along within the grooves as the piston 206 travels in the bore 200.

As will be discussed below, the plunger assembly 34 is preferably configured to provide pressure to the output conduit 54 when the piston 206 is moved in either the forward or rearward direction. The plunger assembly 34 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. An annular shaped second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 may have any suitable seal structure.

Although the plunger assembly 34 may be configured to any suitable size and arrangement, in one embodiment, the effective hydraulic area of the first pressure chamber 240 is greater than the effective hydraulic area of the annular shaped second pressure chamber 242. The first pressure chamber 240 generally has an effective hydraulic area corresponding to the diameter of the central portion 210 of the piston 206 (the inner diameter of the seal 234) since fluid is diverted through the output conduit 54 and the conduits 243 and 254 as the piston 206 is advanced in the forward direction. The second pressure chamber 242 generally has an effective hydraulic area corresponding to the diameter of the first portion 202 of the bore 200 minus the diameter of the central portion 210 of the piston 206. This configuration provides that on the back stroke in which the piston 206 is moving rearwardly, less torque (or power) is required by the motor 214 to maintain the same pressure as in its forward stroke. Besides using less power, the motor 214 may also generate less heat during the rearward stroke of piston 206. Under circumstances when high brake pressure is desired, the plunger assembly 34 could be operated from a forward stroke to a rearward stroke. So while a forward stroke is used in most brake applications, a rearward pressure stroke can be utilized. Also, under circumstances in which the driver presses on the pedal 90 for long durations, the brake system 10 could be operated to maintain brake pressure (instead of continuously energizing the plunger assembly 34) by controlling the first and second plunger valves 250 and 252 (as will be discussed below) to closed positions and then turn off the motor or the plunger assembly 34.

The plunger assembly 34 preferably includes a sensor, schematically shown as 218, for detecting the position of the piston 206 within the bore 200. The sensor 218 is in communication with the main ECU 40. In one embodiment, the sensor 218 may detect the position of the piston 206, or alternatively, metallic or magnetic elements embedded with the piston 206. In an alternate embodiment, the sensor 218 may detect the rotational position of the motor 214 and/or portions of the ball screw mechanism 212 which is indicative of the position of the piston 206. The sensor 218 can be located at any desired position.

The piston 206 of the plunger assembly 34 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 36. When in the rest position, as shown in FIGS. 1 and 3, the pressure chambers 240 and 242 are in fluid communication with the reservoir 36 via the conduit 249, 254 and 243. This helps in ensuring a proper release of pressure at the output of the plunger assembly 34 and within the pressure chambers 240 and 242 themselves. After an initial forward movement of the piston 206 from its rest position, the port 248 will move past the lip seal 234, thereby closing off fluid communication of the pressure chambers 240 and 242 from the reservoir 36, thereby permitting the pressure chambers 240 and 242 to build up pressure as the piston 206 moves further.

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 34) to the output conduit 54 leading to the isolation valves 50 and 52. Note that during a rearward stroke of the piston 206 of the plunger assembly 34, pressure may be generated in the second pressure chamber 242 for output into the output conduit 54. The brake system 10 further includes a check valve 251 permitting fluid to flow in the direction from the conduit 249 (from the reservoir 36) to the conduit 254 and into the first pressure chamber 240 of the plunger assembly 34 such as during a pressure generating rearward stroke of the piston 206.

Generally, the first and second plunger valves 250 and 252 are controlled to permit fluid flow at the outputs of the plunger assembly 34 and to permit venting to the reservoir 36 through the plunger assembly 34 when so desired. For example, the first plunger valve 250 may be energized to its open position during a normal braking event so that both of the first and second plunger valves 250 and 252 are open (which may reduce noise during operation). Preferably, the first plunger valve 250 is almost always energized during an ignition cycle when the engine is running. Of course, the first plunger valve 250 may be purposely moved to its closed position such as during a pressure generating rearward stroke of the plunger assembly 34. The first and second plunger valves 250 and 252 are preferably in their open positions when the piston 206 of the plunger assembly 34 is operated in its forward stroke to maximize flow. When the driver releases the brake pedal 90, the first and second plunger valves 250 and 252 preferably remain in their open positions. Note that fluid can flow through the check valve within the closed second plunger valve 252, as well as through the check valve 251 from the reservoir 36 depending on the travel direction of the piston 206 of the plunger assembly 34.

It may be desirable to configure the first plunger valve 250 with a relatively large orifice therethrough when in its open position. A relatively large orifice of the first plunger valve 250 helps to provide an easy flow path therethrough. The second plunger valve 252 may be provided with a much smaller orifice in its open position as compared to the first plunger valve 250. One reason for this is to help prevent the piston 206 of the plunger assembly 34 from rapidly being back driven upon a failed event due to the rushing of fluid through the first output conduit 254 into the first pressure chamber 240 of the plunger assembly 34, thereby preventing damage to the plunger assembly 34. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 34 upon failure of the brake system 10, such as for example, when power is interrupted or lost to the motor 214 and the pressure within the output conduit 54 is relatively high.

As shown in FIG. 3, the plunger assembly 34 may include an optional spring member, such as a spring washer 277, to assist in cushioning such a rapid rearward back drive of the piston 206, as described in the preceding paragraph. The spring washer 277 may also assist in cushioning the piston 206 moving at any such speed as it approaches a rest position near its most retracted position within the bore 200. Schematically shown in FIG. 3, the spring washer 277 is located between the enlarged end portion 208 and a shoulder 279 formed in the bore 200 between the first and second portions 202 and 204. The spring washer 277 can have any suitable configuration which deflects or compresses upon contact with the piston 206 as the piston 206 moves rearwardly. For example, the spring washer 277 may be in the form of a metal conical spring washer. Alternatively, the spring washer 277 may be in the form of a wave spring. Although the spring washer 277 is shown mounted within the bore 200 of the plunger assembly 34, the spring washer 277 may alternatively be mounted on the piston 206 such that the spring washer 277 moves with the piston 206. In this configuration, the spring washer 277 would engage with the shoulder 279 and compress upon sufficient rightward movement of the piston 206.

The first and second plunger valves 250 and 252 provide for an open parallel path between the pressure chambers 240 and 242 of the plunger assembly 34 during a normal braking operation (with the first plunger valve 250 energized). Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position).

Referring to FIG. 1, the brake system 10 includes the power pack 18 which may function as a secondary source of pressurized fluid during an autonomous braking event and under certain failed conditions of the brake system 10, as will be discussed below. As will also be discussed below, the power pack assembly 18 is hydraulically connected to the brake pedal unit 30 and can transmit pressurized fluid to the brake pedal unit 30 for actuation thereof.

The power pack 18 may include any suitable components which can provide fluid pressure as a secondary source of pressure. In the embodiment shown in FIG. 1, the power pack 18 includes a pump assembly, indicated generally at 270. The pump assembly 270 includes an electric motor 272 driving first and second pumps 274 and 276. For example, the motor 272 could be configured to drive or rotate a shaft having a pair of eccentric bearings for driving pumping elements of the pumps 274 and 276. Alternatively, the motor 272 could be configured to drive separate eccentric shafts, one for each of the pumps 274 and 276.

The pumps 274 and 276 are arranged in a parallel arrangement such they output pressure into the conduit 126 leading to the brake pedal unit 30. More specifically, the output of the pump assembly 270, when actuated, provides pressurized fluid via the conduit 126 to the input chamber 110 of the brake pedal unit 30. The inlets of the pumps are provided with fluid from the reservoir 36 via a conduit 280. The power pack 18 may also include a solenoid actuated valve 282. The valve 282 controls fluid flow between the conduits 126 and 280 (between the outlet and inlet of the pump assembly 270, respectively). To provide pressurized fluid to the brake pedal unit 30, the valve 282 may be energized to its closed position to prevent fluid from the pump assembly 270 from flowing into the reservoir 36 and/or recirculated within the pumps 274 and 276.

The operation of the brake system 10 will now be described. It is noted that the terms "normal braking" or "normal brake apply" generally refers to a braking event in which all of the components of the brake system 10 are functioning normally. Additionally, under a normal braking event, the brake system 10 is not experiencing any detrimental leakage that could hinder proper operation of the brake system 10. FIGS. 1 and 2 illustrates the brake system 10 and the brake pedal unit 30 in their rest positions. In this condition, the driver is not depressing the brake pedal 90. In a non-autonomous braking event, the brake pedal 90 is depressed by the driver of the vehicle indicating their intent in actuating the brake system 10 to decelerate the vehicle. The main ECU 40 detects this braking event by signals from the travel sensor 198 and/or 199 and also by the pressure sensors 192 and 194.

During a normal brake apply braking operation, the flow of pressurized fluid from the brake pedal unit 30 generated by depression of the brake pedal 90 is diverted into the pedal simulator 32. The simulation valve 134 is actuated or energized to divert fluid through the simulation valve 134 from the input chamber 110 of the brake pedal unit 30 as the input piston 102 is moved via the brake pedal 90. Note that fluid flow from the input chamber 110 to the reservoir 36 is closed off once the passageway 124 in the input piston 102 moves past the lip seal 120. As the input piston 102 generates fluid pressure within the input chamber 110, the pressurized fluid is diverted into the pressure chamber 128 of the pedal simulator 32. The build-up of pressure within the pressure chamber 128 of the pedal simulator 32 moves the piston 130 against the bias of the spring assembly 132. Compression of the spring assembly 132 provides a force feedback to the driver of vehicle as the driver feels the resistance on the driver's foot via the brake pedal 90.

During the duration of the normal braking apply, the simulation valve 134 remains open, preferably, in its energized state. Preferably, the simulation valve 134 is energized throughout the duration of an ignition cycle. Also during the normal boost apply braking operation, the isolation valves 50 and 52 are energized to secondary positions to prevent the flow of fluid from the conduits 56 and 58 through the isolation valves 50 and 52, respectively. In one embodiment, the isolation valves 50 and 52 are energized throughout the duration of an ignition cycle such as when the engine is running instead of being energized on and off. This constant energizing helps to minimize noise. The increase of pressure within the input chamber 110 of the brake pedal unit 30, from the leftward movement of the input piston 102, causes initial leftward movement of the primary and secondary pistons 104 and 106. This initial movement is generally halted once the passageways 154 and 164 of the pistons 104 and 106 move past the lip seals 150 and 160, respectively. Prevention of fluid flow through the isolation valves 50 and 52 hydraulically locks the primary and secondary chambers 112 and 114 preventing further movement of the primary and secondary pistons 104 and 106.

During the normal brake apply while the pedal simulator 32 is being actuated by depression of the brake pedal 90, the main ECU 40 operates the main brake circuit 16 to provide actuation of the wheel brakes 20a, 20b, 20c, and 20d. The main ECU 40 actuates and regulates the plunger assembly 34 to provide pressure for the wheel brakes 20a, 20b, 20c, and 20d based on the information from the travel sensor 198 which corresponds to the driver's intent. The plunger assembly 34 is operated to provide desired pressure levels to the wheel brakes 20a, 20b, 20c, and 20d in relation to the pressure generated by the brake pedal unit 30 by the driver depressing the brake pedal 90. The main ECU 40 may also use information from the pressure sensor 196 generally located at the output of the plunger assembly 34 to regulate the motor 214 of the plunger assembly 34 to obtain a desired pressure level within the output conduit 54.

To operate the plunger assembly 34, the main ECU 40 actuates the motor 214 to rotate the screw shaft 216 in a first rotational direction. Rotation of the screw shaft 216 in the first rotational direction causes the piston 206 to advance in the forward direction (leftward as viewing FIGS. 1 and 3). Movement of the piston 206 causes a pressure increase in the first pressure chamber 240 and fluid to flow out of the first pressure chamber 240 and into the conduit 254. Fluid can flow into the output conduit 54 via the open first and second plunger valves 250 and 252. Note that fluid is permitted to flow into the second pressure chamber 242 via the conduit 243 as the piston 206 advances in the forward direction. Pressurized fluid from the output conduit 54 is directed into the conduits 60 and 62 through the isolation valves 50 and 52, respectively. The pressurized fluid from the conduits 60 and 62 can be directed to the wheel brakes 20a, 20b, 20c, and 20d through open apply valves 70, 74, 78, and 82 while the dump valves 72, 76, 80, and 84 remain closed. It is noted that the first plunger valve 250 is energized to its open position during a normal braking event so that both of the first and second plunger valves 250 and 252 are open. The plunger valve 250 may be energized throughout the duration of an ignition cycle.

When the driver lifts off or releases the brake pedal 90, the main ECU 40 can operate the motor 214 to rotate the screw shaft 216 in the second rotational direction causing the piston 206 to retract withdrawing the fluid from the wheel brakes 20a, 20b, 20c, and 20d. The speed and distance of the retraction of the piston 206 is based on the demands of the driver releasing the brake pedal 90 as sensed by the sensor 218. Under certain conditions, the pressurized fluid from the wheel brakes 20a, 20b, 20c, and 20d may assist in back-driving the ball screw mechanism 212 moving the piston 206 back towards its rest position. Note that when the driver releases the brake pedal 90, the first and second plunger valves 250 and 252 preferably remain in their open positions.

During a braking event, the main ECU 40 can also selectively actuate the apply valves 70, 74, 78, and 82 and the dump valves 72, 76, 80, and 84, respectively, to provide a desired pressure level to the wheel brakes 20a, 20b, 20c, and 20d. This selective actuation of the wheel brakes 20a, 20b, 20c, and 20d may even be in conflict of the driver's intent as sensed by the travel sensor 198. For example, the main ECU 40 can control the main circuit 16 of the brake system 10 during ABS, DRP, TC, VSC, regenerative braking, and/or autonomous braking events by general operation of the plunger assembly 34 in conjunction with selective actuation the apply valves 70, 74, 78, and 82 and the dump valves 72, 76, 80, and 84. Under certain driving conditions, the main ECU 40 communicates with a powertrain control module (not shown) and other additional braking controllers of the vehicle to provide coordinated braking during these advanced braking control schemes (e.g., anti-lock braking (AB), traction control (TC), vehicle stability control (VSC), and regenerative brake blending, amongst others).

In some situations such as a relatively large brake pressure demand or extended slip control event, the piston 206 of the plunger assembly 34 may reach its full stroke length within the bore 200 of the housing and additional boosted pressure is still desired to be delivered to the wheel brakes 20a, 20b, 20c, and 20d. The plunger assembly 34 is a dual acting plunger assembly such that it is configured to also provide boosted pressure to the output conduit 54 when the piston 206 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 206 has reached its full stroke, for example, and additional boosted pressure is still desired, the second plunger valve 252 is energized to its closed check valve position. The first plunger valve 250 is de-energized to its closed position. The main ECU 40 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 3). Movement of the piston 206 causes a pressure increase in the second pressure chamber 242 and fluid to flow out of the second pressure chamber 242 and into the conduit 243 and the output conduit 54. Pressurized fluid from the output conduit 54 is directed into the conduits 60 and 60 through the isolation valves 50 and 52. The pressurized fluid from the conduits 60 and 62 can be directed to the wheel brakes 20a, 20b, 20c, and 20d through the opened apply valves 70, 74, 78, and 82 while dump valves 72, 76, 80, and 84 remain closed.

In a similar manner as during a forward stroke of the piston 206, the main ECU 40 can also selectively actuate the apply valves 70, 74, 78, and 82 and the dump valves 72, 76, 80, and 84 to provide a desired pressure level to the wheel brakes 20a, 20b, 20c, and 20d, respectively. When the driver completely lifts off or releases the brake pedal 90 during a pressurized rearward stroke of the plunger assembly 34, the first and second plunger valves 250 and 252 are preferably operated to their open positions, although having only one of the valves 250 and 252 open would generally still be sufficient. Note that when transitioning out of a slip control event, the ideal situation would be to have the position of the piston 206 and the displaced volume within the plunger assembly 34 correlate just about exactly with the given pressures and fluid volumes within the wheel brakes 20*a*, 20*b*, 20*c*, and 20*d*. However, when the correlation is not exact, fluid can be drawn from the reservoir 36 via the check valve 251 into the chamber 240 of the plunger assembly 34. To vent the plunger assembly 34, fluid may flow through the port 248 to the reservoir 36.

In the event of a loss of electrical power to portions of the main brake circuit 16, the brake system 10 provides for a manual push-through or manual apply such that the brake pedal unit 30, which is operated by the driver via the brake pedal 90, can supply relatively high pressure fluid to the primary output conduit 58 and the secondary output conduit 56. Thus, the terms "manual push-through" or "a manual push-through event or mode" refers to the situation in which the brake pedal 90 is being depressed for actuation of the brake pedal unit 30, and at least a portion of the main brake circuit 16 is not operating properly or a detrimental leak has occurred within the brake system 10. Note that during a manual push-through event, the pedal simulator 32 is not being utilized as intended.

During an electrical failure, the motor 214 of the plunger assembly 34 might cease to operate, thereby failing to produce pressurized hydraulic brake fluid from the plunger assembly 34 to the output conduit 54. During the electrical failure, the main ECU 40 may also be inoperable and may be unable to actuate the plunger assembly 34 or the solenoid valves of the main brake circuit 16. In this situation, the isolation valves 50 and 52 will shuttle (or remain) in their de-energized positions to permit fluid flow from the conduits 56 and 58 to the wheel brakes 20*a*, 20*b*, a 20 *c*, and 20*d*. The pedal simulator valve 134 will shuttle (or remain) to its de-energized closed position to prevent fluid from flowing out of the input chamber 110 to the pedal simulator 134. The closing of the conduit 118 to the pedal simulator will assist in causing the input chamber 110 to be hydraulically locked. During the manual push-through apply, when the driver continues to push on the brake pedal 90, the input piston 102, the primary piston 104, and the secondary piston 106 will advance leftwardly, as viewing FIGS. 1 and 2. This advancement will cause the passageways 124, 154, 164 to move past the seals 120, 150, and 160, respectively, to prevent fluid flow from their respective fluid chambers 110, 112, and 114 to the reservoir 36, thereby now allowing the chambers 110, 112, and 114 to be pressurized. Fluid flows from the primary and the secondary chambers 112 and 114 into the conduits 58 and 56, respectively, to actuate the wheel brakes 20*a*, 20*b*, 20*c*, and 20*d*.

During certain conditions in which the main circuit 16 and/or the main ECU are experiencing failed conditions, such as those described above, it may be desirable to actuate the wheel brakes even if the driver is not depressing the brake pedal 90, such as for example, an autonomous braking event. In these situations, the plunger assembly 34 is not able to supply pressurized fluid to the main brake circuit 16 nor is the brake pedal unit 30 able to generate pressure from the driver of the vehicle pressing on the brake pedal 90. For these unusual conditions, the power pack assembly 14 can be actuated by the secondary ECU 42 to provide a back-up boost function. Examples of failed conditions in which autonomous braking via the power pack assembly 14 may be engaged include failure of the main ECU 40, failure of the plunger assembly 34, and electrical failures involving connections with the main ECU 40. Thus, the secondary ECU 42 can operate the brake system 10, with some limitations, even upon failure of the main ECU 40. In one example, the secondary ECU 42 may be able to operate the brakes with proportional control but may not be able to provide anti-lock or slip control features. It may be desirable to remotely locate the secondary ECU 42 both physically and electrically from the main ECU 40 for these reasons.

To operate the power pack assembly 14, the motor 272 of the pump assembly 270 is actuated and controlled by the secondary ECU 42 to drive the pumps 272 and 274 of the pump assembly 270. The pumps 272 and 274 provide pressurized fluid at their outlets into the conduit 126. Note that the inlets of the pumps 272 and 274 are provided with fluid from the reservoir 36 via the conduit 280. An increase in pressure within the conduit 126 from the pumps 272 and 274 causes an increase in pressure within the input chamber 110 of the brake pedal unit 30. Increased pressure within the input chamber 110 causes an expansion therein which causes movement of the primary piston 102 in the leftward direction as viewing FIGS. 1 and 2. Movement of the primary piston 102 pressurizes the primary chamber 112 which causes movement of the secondary piston 106 which in turn pressurizes the secondary chamber 114. Fluid from the pressurized primary and secondary chambers 112 and 114 flows into the conduits 58 and 56, respectively, and to the wheel brakes 20*a*, 20*b*, 20*c*, and 20*d* through the de-energized isolation valves 52 and 50.

The secondary ECU 42 is preferably separate from the main ECU 42 and may include its own power supply such that an electrical disconnection or failure of the main ECU 40 may not affect the secondary ECU 42. Thus, the main ECU 40 and the secondary ECU 42 are preferably separate from one another such that any failure of the main ECU should not automatically lead to failure of the secondary ECU 42. The secondary ECU may also be physically spaced from the main ECU 40.

In one preferred embodiment, the secondary ECU 42 can regulate the power pack assembly 14 to provide a desired pressure level within the conduit 126 and the input chamber 110 of the brake pedal unit 30, thereby affecting the pressure at the wheel brakes 20*a*, 20*b*, 20*c*, and 20*c*. The valve 282 of the power pack assembly 14 is used to regulate the fluid pressure output of the pumps 274 and 276. If it is determined that the pump assembly 270 is providing too much pressure to the conduit 126, the secondary ECU can operate the valve 282 to its open position to vent pressure from the outlets of the pumps 274 and 276 to their inlets. Optionally, the valve 282 may be a variable or proportional solenoid controlled valve such that more precise control can be achieved by altering the orifice area versus using a simple digital or binary open/closed type valve design.

In one embodiment of the brake system 10, the brake pedal unit 30 may be designed and configured such that the primary and secondary chambers 112 and 114 provide relatively the same fluid volume and pressure output upon movement of the input piston 102. Thus, under a manual push-through event or under a failure of the main brake circuit 16 in which the power pack assembly 14 is utilized, the pressure increase in the conduits 56 and 58 is essentially identical. This arrangement may be ideal for a diagonally split system in which the conduit 56 is associated with wheel brakes in opposite corners of the vehicle, and the conduit 58 is associated with the other diagonally opposite wheel brakes. This arrangement may also be used for a vertical split system, as described with respect to the brake system 10 of FIG. 1, wherein the conduit 56 is associated with the front wheel brakes 20*a* and 20*b*, and the conduit 58 is associated with the rear wheel brakes 20*c* and 20*d*. In this situation, the secondary chamber 114 of the brake pedal unit 30 is associated with the front wheel brake circuit, and the primary chamber 112 is associated with the rear wheel brake circuit.

However, it may be desirable to design and configure the primary and secondary chambers 112 and 114 to provide different pressure outputs. For example, for relatively large trucks, it may be desirable to provide a greater fluid volume for the front wheel brakes 20a and 20b than for the rear wheel brakes 20c and 20d. In this example, the fluid volume for actuation of the front brakes 20a and 20b may be greater than the fluid volume needed for actuation of the rear brakes 20c and 20d. Thus, the front wheel brakes 20a and 20b are configured differently than the rear wheel brakes 20c and 20d. For this embodiment, the area of the secondary piston 114 of the brake pedal unit 30 is preferably greater than the effective area of the primary piston 112. The effective area of the primary piston 112 is generally the area of the primary piston 112 minus the area of the secondary piston 114. Of course, the area of the secondary piston 114 may be designed with an effective area less than the primary piston 112 such as, for example, trucks having a rear brake bias.

In addition to performing controlled braking operations such as ABS, traction control, vehicle stability control, and regenerative braking blending, the brake system 10 is also preferably configured to perform Dynamic Rear Proportioning (DRP). To achieve maximum braking forces while maintaining vehicle stability, it is desirable to achieve optimum slip levels at the wheels of both the front and rear axles. During vehicle deceleration different braking forces are required at the front and rear axles to reach the desired slip levels. A DRP event can be accomplished by separately controlling the braking pressures on the front and rear wheels to dynamically achieve optimum braking performance at the front and rear axles. Therefore, the brake pressures should be proportioned between the front and rear brakes to achieve the highest braking forces at each axle.

For this configuration and under a normal non-failure braking event, it is desirable to limit the pressure increase in the rear wheel brakes 20c and 20d as the pressure in the front wheel brakes 20a and 20b is increased. For example, under a DRP event, it may be desirable to energize the apply valves 78 and 82 associated with the rear wheel brakes 20c and 20d, respectively, to a closed position and permit a pressure increase in the front wheel brakes 20a and 20b through open apply valves 70 and 74. Throughout the DRP event, the main ECU 40 will control the main brake circuit 16 as necessary to obtain a desired reduced pressure at the rear wheel brakes 20c and 20d until the DRP event has ended.

It may also be desirable to control the brake system 10 under a Dynamic Rear Proportioning (DRP) event even when the main circuit 16 is under a failed condition. In this situation, the power pack assembly 14 and the secondary ECU 42 may be used to provide pressure to the main brake circuit 16 when the driver is not depressing the brake pedal 90 (e.g., an autonomous braking event and not during a manual push-through event). For brake systems having the same pressure outputs at the primary and secondary chambers 112 and 114 of the brake pedal unit 30, obtaining optimum slip levels at the wheels of both the front and rear axles can be accomplished by controlling the appropriate apply valves 70, 74, 78, and 82 and dump valves 72, 76, 80, and 84 in a similar manner as described above relative to a normally functioning brake system. However, if the brake system 10 is configured such that the brake pedal unit 30 is designed for different pressure outputs at the primary and secondary chambers 112 and 114, control of the apply valves 70, 74, 78, and 82 could inadvertently hydraulically lock one or more of the chambers of the brake pedal unit 30, thereby preventing proper generation therefrom, while the power pack assembly 14 is being utilized. To overcome this possibility, the secondary ECU 42 may instead control appropriate dump valves to vent the pressure from the rear wheel brakes to lower the pressure at the rear wheel brakes relative to the front wheel brakes. Thus, to provide a DRP function, it may be desirable that the brake system 10 be configured such that the secondary ECU 42 is able to actuate and control at least the dump valves 80 and 84 to vent pressure from the rear wheel brakes 20c and 20d to maintain stability. For this scenario, instead of blocking pressure to the rear wheel brakes to permit an increase if pressure to the front wheel brakes, the pressure at the rear wheels is vented to reduce pressure. Note that although this operation will provide a desired DRP function, venting from the rear wheel brakes reduces the volume of pressurized fluid from the main brake circuit 16 generated from the brake pedal unit 30 by the power pack assembly 14.

In controlling this rear wheel brake venting, one of the issues is that fully opening the rear dump valves 80 and 84 could cause the pressure within the rear wheel brakes 20c and 20d to drop and the pressure within the front wheel brakes 20a and 20b would increase. Preferably, the desired control algorithm maintains the pressure within the rear wheel brakes 20c and 20d at a constant pressure versus permitting the pressure within the rear wheel brakes 20c and 20d to drop to near zero pressure to achieve a desired minimum stopping distance. Due to signals from the redundant pressure sensor 194, the pressure within the secondary chamber 114 of the brake pedal unit 30 is known by the secondary ECU 42 and the estimated pressure within the input chamber 110. Information obtained from feedback from the motor 272 and control of the isolation valve 282 of the power pack assembly 14 can also be used by the secondary ECU 42 to estimate the pressure within the input chamber 110. The rear dump valves 80 and 84 can be pulsed (controlled) by the secondary ECU 42 until a desired rear brake pressure is achieved. Thus, even if the secondary ECU 42 is only connected to and able to energize the dump valves 80 and 84 (and not connected to any of the other dump and apply valves), stability of the vehicle can be achieved. Control of only a pair of dump valves 80 and 84 can reduce the cost and complexity of the secondary ECU 42.

The dump valves 80 and 84 can have any suitable configuration such that they can be controlled by both the main ECU 40 and the secondary ECU 42. The dump valves 80 and 84 can be a standard single wound solenoid actuated dump valve with a modified electronic circuit in the main ECU 40 and/or secondary ECU 42 to permit dual control by the ECUs 40 and 42. Alternatively, a double wound solenoid could be integrated into the dump valves 80 and 84 to permit dual control by the ECUs 40 and 42.

The secondary ECU 42 may also be used, when the main ECU 40 is not functioning properly, to perform a DRP event even during a manual push through operation. The pump assembly 270 of the power pack assembly 14 may not be actuated but instead pressure for the main brake circuit 16 can be provided by the brake pedal unit 30 by the driver depressing the brake pedal 90. The main brake circuit 16 is then controlled by the secondary ECU 42 for the DRP as explained above.

Although the power pack assembly 14 was described above as being only used during a failed brake system event, the power pack assembly 14 could be utilized periodically and actuated during self-diagnostic checks to verify that the power pack assembly 14 and other components of the brake system 10 are operating properly. The solenoid valve 282 of the power pack assembly may also be used during various diagnostic checks even if the pump assembly 270 is not operated. The secondary ECU 42 may utilize the signal from the pressure sensor 194 and the travel sensor 199 for diagnostic purposes to determine if the brake pedal unit 30 is operating properly. Information from the sensors 194 and 199 may allow the secondary ECU 42 and the power pack assembly 14 to independently determine if the brake pedal unit 30 is working properly. For example, for the vertically split configuration of the brake system 10, it is preferred to limit the amount of fluid venting within the rear circuit if it was previously determined that the brake pedal unit 30 leaks in the front circuit. With respect to a diagonally split configuration, it can be determined if the pedal travel of the brake pedal unit corresponds to the pressure within the brake pedal unit, and if not, then this may indicate the presence of a leak. If a leak is detected, the appropriate rear apply valve on the good non-leaking circuit is controlled to maximize vehicle deceleration.

Although the ECUs 40 and 42 are preferably separate from one another, the ECUs 40 and 42 may be connected together and are able to communicate with one another. For example, the ECUs 40 and 42 could be connected such that if the ECU 40 fails or any of the components with the main brake circuit fails, the ECU 42 can identify the failure and then operate the power pack assembly 14 accordingly.

There is illustrated in FIG. 4 an alternate embodiment of a brake system, indicated generally at 300. The brake system 300 is very similar to the brake system 10 described above and thus the function and structure of the components of the brake system 300 may not necessarily be duplicated here. Similar to the brake system 10, the brake system 300 includes a main block or housing 302 for receiving a main brake circuit 304. A power pack housing 306 houses a power pack assembly 308. The brake system 10 further includes a brake pedal unit, indicated generally at 310, a reservoir 312, a pedal simulator 314, a simulation valve 316, and a plunger assembly 318 all of which may function in a similar manner as described above with respect to the brake system 10. The brake system 300 further includes a main ECU 320 for control of the main brake circuit 304, and a secondary ECU 322 for controlling the power pack assembly 308. The ECUs 320 and 322 may function similarly as the ECUs of the brake system 10 with the exceptions discussed below.

Instead of a vertically split system configuration like the brake system 10, the brake system 300 is preferably configured as a diagonally split system in which each of the two hydraulic circuits associated with isolation valves 330 and 332 is in fluid communication with one front wheel and the opposite rear wheel. For example, the brake system 300 may be configured such that a wheel brake 340a is associated with a left rear wheel of the vehicle. A wheel brake 340b is associated with a right front wheel. A wheel brake 340c is associated with a left front wheel. A wheel brake 340d is associated with a right rear wheel. Thus, a secondary chamber 350 of the brake pedal unit 318 provides fluid to the left rear and right front wheel brakes 340a and 340b, and a primary chamber 352 of the brake pedal unit 318 provides fluid to the left front and right rear wheel brakes during a manual push-through event.

Due to this diagonally split arrangement, it is preferred that all four of the wheel brakes 340a, 340b, 340c, and 340d are similarly designed such that the fluid volume for actuation of each diagonal pair of brakes is the same, unlike that described above with respect to one embodiment of the brake system 10. Consequently, the brake pedal unit 310 is designed and configured such that the primary and secondary chambers 352 and 350 provide relatively the same fluid volume and pressure output upon movement of an input piston 354.

The brake system 3000 further includes apply valves 360, 362, 364, and 366, dump valves 370, 372, 374, and 376 which may function in a similar manner as the valves described above with respect to the brake system 2700.

Instead of controlling the dump valves 80 and 84, as in the brake system 10, the secondary ECU 322 of the brake system 200 can be configured to control the apply valves 360 and 366 associated with the rear wheel brakes 340a and 340d, respectively. The wheel brakes 340a are associated with the rear wheels of the vehicle. In this situation, it would not be necessary for the secondary ECU 322 to control any of the dump valves 370, 372, 374, and 366 nor the other two apply valves 362 and 364. During a failed braking event, such as for example when the main ECU 320, the main brake circuit 304, and/or the plunger assembly 318 are inoperable, and DRP control is desired, the apply valves 360 and 366 can be actuated by the secondary ECU 322 to their closed positions. The other apply valves 362 and 364 are in their normal de-energized open positions to provide increase pressure to the front wheel brakes 340b and 340c via the secondary and primary chambers 350 and 352 of the brake pedal unit 310. It may be desirable to control the brake system 300 in this manner to reduce loss volume of fluid from venting rear wheel brakes to the reservoir 312 via dump valves, as during the control of the brake system 10 described above.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system for actuating a pair of front wheel brakes and a pair of second wheel brakes, the system comprising:
    a reservoir;
    a brake pedal unit including a housing with first and second pistons slidably disposed in the housing, the first and second pistons being operable during a manual push-through mode by actuation of a brake pedal connected to the brake pedal unit such that the first and second pistons are movable to generate brake actuating pressure at first and second outputs for actuating the pair of front wheel brakes and the pair of rear wheel brakes;
    a first source of pressurized fluid for actuating the pair of front wheel brakes and the pair of rear wheel brakes during a non-failure normal braking event;

a first electronic control unit for controlling the first source of pressurized fluid;

a second source of pressurized fluid hydraulically connected to the brake pedal unit for actuating the brake pedal unit to cause movement of the first and second pistons for generating pressure at the first and second outputs;

a second electronic control unit, separate from the first electronic control unit, for controlling the second source of pressurized fluid;

wherein the brake pedal unit further includes an input piston slidably disposed in the bore such that movement of the input piston pressurizes an input pressure chamber, and wherein the input piston is connected to the brake pedal;

wherein the second source of pressurized fluid is in fluid communication with the input pressure chamber of the brake pedal unit; and wherein the brake system further includes a pedal simulator in selective fluid communication with the input pressure chamber, and wherein the brake system further includes a simulator valve selectively permitting fluid communication between the input pressure chamber and the pedal simulator.

2. The system of claim 1 further including:

a first pair of apply valves for selectively permitting the flow of pressurized fluid to the pair of front wheel brakes from the first source of pressurized fluid during a non-failure normal braking event, and for selectively permitting the flow of pressurized fluid to the pair of front wheel brakes from the brake pedal unit;

a first pair of dump valves for venting pressurized fluid from the pair of front wheel brakes to the reservoir;

a second pair of apply valves for selectively permitting the flow of pressurized fluid to the pair of rear wheel brakes from the first source of pressurized fluid during a non-failure normal braking event, and for selectively permitting the flow of pressurized fluid to the pair of rear wheel brakes from the brake pedal unit; and a second pair of dump valves for venting pressurized fluid from the pair of rear wheel brakes.

3. The system of claim 2, wherein the first output of the brake pedal unit is in fluid communication with the first pair of apply valves, and wherein the second output of the brake pedal unit is in fluid communication with the second pair of apply valves.

4. The system of claim 2, wherein the first output of the brake pedal unit is in fluid communication with one of the first pair of apply valves and one of the second pair of apply valves, and wherein the second output of the brake pedal unit is in fluid communication with the other of the first pair of apply valves and the other of the second pair of apply valves.

5. The system of claim 1, wherein the first and second pairs of apply valves and the first and second pairs of dump valves are controlled by the first electronic control unit.

6. The system of claim 5, wherein the second pair of dump valves are further controlled by the second electronic control unit.

7. The system of claim 6, wherein the second pair of dump valves are solenoid actuated valves having a double wound coil.

8. The system of claim 5, wherein the second pair of apply valves are further controlled by the second electronic control unit.

9. The system of claim 8, wherein the second pair of apply valves are solenoid actuated valves having a double wound coil.

10. The system of claim 1, wherein the second source of pressurized fluid includes a fluid pump driven by an electric motor.

11. The system of claim 10, wherein the second source of pressurized fluid includes a solenoid actuated valve for selectively diverting fluid from an outlet of the pump to an inlet of the pump and the reservoir.

12. The system of claim 1 further including a first travel sensor in communication with the first electronic control unit for sensing movement of the input piston, and wherein the brake system includes a second travel sensor in communication with the second electronic control unit for sensing movement of the input piston.

13. The system of claim 1, wherein the first source of pressurized fluid is a plunger assembly including a housing defining a bore therein, wherein the plunger assembly includes a piston slidably disposed in the bore of the plunger assembly such that movement of the piston pressurizes a pressure chamber when the piston is moved in a first direction, and wherein the pressure chamber of the plunger assembly is in fluid communication with an output, and wherein the plunger assembly further includes an electrically operated linear actuator for moving the piston within the bore.

14. The system of claim 1, wherein the first and second pistons of the brake pedal unit are connected together to permit limited movement therebetween.

15. The system of claim 1, wherein the brake pedal unit is configured to provide a greater volume of fluid to the pair of front wheel brakes than the volume of fluid provided to the pair of rear wheel brakes.

16. A brake system for actuating a pair of front wheel brakes and a pair of second wheel brakes, the system comprising:

a reservoir;

a brake pedal unit including a housing with first and second pistons slidably disposed in the housing, the first and second pistons being operable during a manual push-through mode by actuation of a brake pedal connected to the brake pedal unit such that the first and second pistons are movable to generate brake actuating pressure at first and second outputs for actuating the pair of front wheel brakes and the pair of rear wheel brakes, and wherein the brake pedal unit further includes an input piston slidably disposed in the bore such that movement of the input piston pressurizes an input pressure chamber, and wherein the input piston is connected to the brake pedal;

a first source of pressurized fluid for actuating the pair of front wheel brakes and the pair of rear wheel brakes during a non-failure normal braking event, wherein the first source of pressurized fluid is a plunger assembly including a housing defining a bore therein, wherein the plunger assembly includes a piston slidably disposed in the bore of the plunger assembly such that movement of the piston pressurizes a pressure chamber when the piston is moved in a first direction, and wherein the pressure chamber of the plunger assembly is in fluid communication with an output, and wherein the plunger assembly further includes an electrically operated linear actuator for moving the piston within the bore;

a first electronic control unit for controlling the first source of pressurized fluid;

a second source of pressurized fluid hydraulically connected to the input pressure chamber of the brake pedal unit for actuating the brake pedal unit to cause movement of the first and second pistons for generating pressure at the first and second outputs, wherein the second source of pressurized fluid includes a fluid pump driven by an electric motor, and wherein the second source of pressurized fluid includes a solenoid actuated valve for selectively diverting fluid from an outlet of the pump to an inlet of the pump and the reservoir;

a pedal simulator in selective fluid communication with the input pressure chamber;

a simulator valve selectively permitting fluid communication between the input pressure chamber and the pedal simulator;

a second electronic control unit, separate from the first electronic control unit, for controlling the second source of pressurized fluid;

a first pair of apply valves for selectively permitting the flow of pressurized fluid to the pair of front wheel brakes from the first source of pressurized fluid during a non-failure normal braking event, and for selectively permitting the flow of pressurized fluid to the pair of front wheel brakes from the brake pedal unit;

a first pair of dump valves for venting pressurized fluid from the pair of front wheel brakes to the reservoir;

a second pair of apply valves for selectively permitting the flow of pressurized fluid to the pair of rear wheel brakes from the first source of pressurized fluid during a non-failure normal braking event, and for selectively permitting the flow of pressurized fluid to the pair of rear wheel brakes from the brake pedal unit; and a second pair of dump valves for venting pressurized fluid from the pair of rear wheel brakes;

wherein the first and second pairs of apply valves and the first and second pairs of dump valves are controlled by the first electronic control unit, and wherein one of the second pair of dump valves and second pair or apply valves are further controlled by the second electronic control unit.

17. The system of claim 16 further including a first travel sensor in communication with the first electronic control unit for sensing movement of the input piston, and wherein the brake system includes a second travel sensor in communication with the second electronic control unit for sensing movement of the input piston.

* * * * *